No. 741,935. PATENTED OCT. 20, 1903.
A. SCHICKERLING.
TRAP FOR CATCHING MICE OR RATS.
APPLICATION FILED JULY 2, 1903.
NO MODEL.

Witnesses:—
George Barry Jr
Henry Thieme

Inventor:—
Alfred Schickerling
by attorneys

No. 741,935. Patented October 20, 1903.

UNITED STATES PATENT OFFICE.

ALFRED SCHICKERLING, OF JERSEY CITY, NEW JERSEY.

TRAP FOR CATCHING MICE OR RATS.

SPECIFICATION forming part of Letters Patent No. 741,935, dated October 20, 1903.

Application filed July 2, 1903. Serial No. 164,016. (No model.)

*To all whom it may concern:*

Be it known that I, ALFRED SCHICKERLING, a citizen of the United States, and a resident of Jersey City, in the county of Hudson and State of New Jersey, have invented a new and useful Trap for Catching Mice or Rats, of which the following is a specification.

My invention relates to a trap for catching mice and rats, and more particularly to an attachment which may be readily applied to vessels—such, for example, as milk, fruit, meat, and vegetable cans—which are commonly thrown away and usually with a portion of the contents of the can adhering thereto or remaining therein as to afford sufficient bait to attract the mouse or rat to enter the can.

A practical embodiment of my invention is represented in the accompanying drawings, in which—

Figure 1:
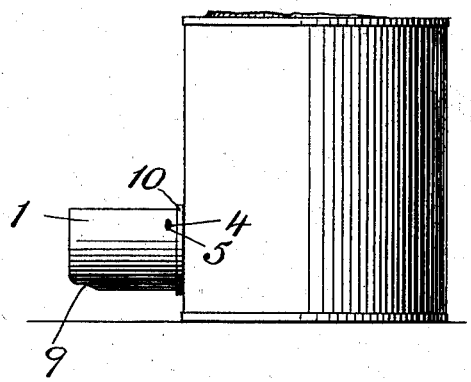
Figure 2:
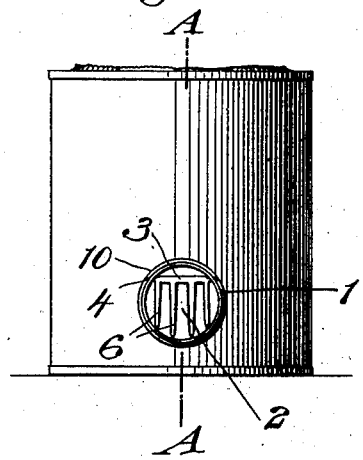
Figure 3:
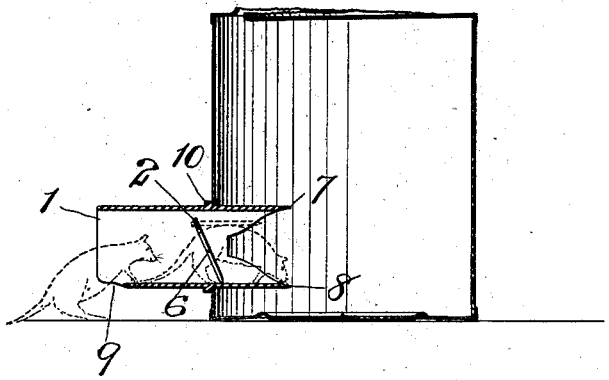
Figure 4:
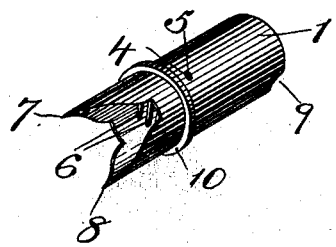

Figure 1 is a side view of the trap complete, showing the attachment inserted in the wall of a can. Fig. 2 is a front view of the same. Fig. 3 is a vertical longitudinal section in the plane of the line A A of Fig. 2, and Fig. 4 is a view of the attachment in perspective looking from the rear.

The attachment consists of a tubular casing 1, within which a gate 2 is located and so arranged as to admit of the ready passage of a mouse or rat in one direction through the tube, while preventing the return of the animal.

The device which I prefer to employ is a skeleton gate suspended from the wall of the tube and free to swing in a direction to open the way through the tube into the vessel to which it is attached, while free to return under the influence of gravity to close the tube against passing out of it from the said vessel.

The gate 2 consists of a bar 3, provided with pintles 4 at its opposite ends, which engage bearings 5 in the wall of the tube 1, and from the bar 3 fingers 6 depend, in the present instance four fingers, the lengths of the fingers being such that one or more of them will engage the bottom or some portion of the inner wall of the tube before the gate reaches a position at right angles to the tube—that is, before it reaches a position which will admit of its being swung outwardly. The gate therefore rests normally in the oblique position shown in Fig. 3, and for purposes of greater effectiveness I prefer to locate two of the fingers 6 on opposite sides of the vertical central longitudinal plane of the tube, so that there shall be a free space directly in front of the animal as it creeps along the natural path at the bottom of the tube.

The rear or inner end of the tube 1 is provided with or shaped to form pointed cutting-blades 7 8, which will admit of the tube being readily inserted through the wall of the tin can under pressure, and by a slight rotary movement of the tube when so inserted a piece of the wall of the can corresponding to the size of the tube will be cut out and may be removed unless it chances to free itself and the tube then inserted to set the trap.

For the purpose of indicating the proper rotary position of the tube 1 to cause the gate to hang in operative position within it when the can is standing upright I cut away the wall of the lower outer end of the tube, as shown at 9, and this feature also makes the entrance to the interior of the tube somewhat easier and more effective in practice. I further provide an annular shoulder 10 around the periphery of the tube for limiting the distance which the tube may be inserted into the can.

In operation the attachment may be inserted in any can which happens to have been emptied of its contents at the time, and when it has served its purpose as a trap the attachment and can may be thrown into water to drown the animal or animals which may have been caught, the attachment then removed ready for future use, and the can, with its contents, thrown into the ash-barrel or other suitable waste heap.

The cans which have hitherto been of no use are thus converted into effective traps for keeping the house and premises free from the pests.

What I claim is—

The combination with a can in which food is shipped, of a tube provided with means for cutting its way into the can under pressure, and a skeleton gate hung in the tube and free to swing open in one direction only under pressure and adapted to automatically close.

In testimony that I claim the foregoing as my invention I have signed my name, in presence of two witnesses, this 29th day of June, 1903.

ALFRED SCHICKERLING.

Witnesses:
FREDK. HAYNES,
GEORGE BARRY, Jr.